United States Patent
Yu

[19]

[11] Patent Number: 6,078,443
[45] Date of Patent: Jun. 20, 2000

[54] ROTARY DISK FOR IMAGE-CHANGING LIGHT DEVICE

[75] Inventor: Jason Yu, Taipei, Taiwan

[73] Assignee: J.A.L. Taiwan Ltd., Taiwan

[21] Appl. No.: 08/583,176

[22] Filed: Jan. 4, 1996

[51] Int. Cl.[7] .................................................. G02B 5/22
[52] U.S. Cl. ......................................... 359/892; 362/293
[58] Field of Search .................................. 359/889, 892; 362/293

[56] References Cited

U.S. PATENT DOCUMENTS

| | | | |
|---|---|---|---|
| 1,613,562 | 1/1927 | Frost | 359/889 |
| 3,856,418 | 12/1974 | Levine | 359/892 |
| 4,533,212 | 8/1985 | Shimizu | 359/892 |
| 4,800,474 | 1/1989 | Bornhorst | 359/889 |
| 5,060,126 | 10/1991 | Tyler et al. | 359/892 |
| 5,528,714 | 6/1996 | Kingstone et al. | 385/100 |

Primary Examiner—Cassandra Spyrou
Assistant Examiner—John Juba, Jr.
Attorney, Agent, or Firm—Welsh & Katz, Ltd.

[57] ABSTRACT

A rotary disk for an image-changing light device includes a metal disk body adapted to be disposed in the light device. The disk body is formed by two disk halves coupled detachably with each other, and a plurality of colored lenses. Each of the disk halves is pressed to form a circle of angularly spaced recess units and is punched to form a circle of openings through the disk half. Each of the recess units is defined by a bottom wall unit through a portion of which a corresponding one of the openings is formed so that the light beam emitted from a light emitting unit of the light device can pass through the openings when the disk rotates. Each of the lenses is clamped between the bottom wall units of the disk halves in such a manner that a portion of the lens is fitted within a corresponding one of the recess units of one of the disk halves while another portion of the lens is fitted within a corresponding one of the recess units of the other one of the disk halves.

4 Claims, 7 Drawing Sheets

FIG. 2A (PRIOR T)

6,078,443

ROTARY DISK FOR IMAGE-CHANGING LIGHT DEVICE

BACKGROUND OF THE INVENTION

1. Field of the Invention

The invention relates to a rotary disk, more particularly to a rotary disk adapted to be employed in an image-changing light device so as to provide visual entertainment.

2. Description of the Related Art

Referring to FIG. 1, an image-changing light device is shown to include a box-like container 10, an electric motor 14 mounted in the container 10, a rotary disk 15 mounted on the output shaft 13 of the motor 14 so that the disk 15 rotates when the motor 14 is actuated, and a light emitting unit 11 for emitting a light beam through the disk 15. As illustrated in FIGS. 2 and 2A, the disk 15 includes a disk body formed with a circle of openings 16 therethrough, and a plurality of colored lenses 17 attached adhesively to the disk body so as to cover the openings 16 such that the light beam passes through the lenses 17 at different time during rotation of the disk body in order to provide visual entertainment.

It is inconvenient to fix the lenses 16 adhesively one by one. The adhesive 160 may dry due to long exposure to the light, thereby resulting in the removal of the lenses 16 from the disk body 15. Referring to FIG. 3, the lenses 17 (see FIG. 2) cannot be reused so as to cover different openings 190 of a new disk body 19, thereby limiting the utility range of the lenses 17.

SUMMARY OF THE INVENTION

The object of this invention is to provide a rotary disk which is adapted to be employed in an image-changing light device and which is clear from the aforesaid drawbacks that are generally associated with the prior art.

Accordingly, the rotary disk for an image-changing light device of this invention includes a metal disk body containing two disk halves coupled detachably with each other, and a plurality of colored lenses. Each of the disk halves is pressed to form a circle of angularly spaced recess units and is punched to form a circle of openings through the disk half. Each of the recess units is defined by a bottom wall unit through a portion of which a corresponding one of the openings is formed. A light beam emitted from the light emitting unit of the device can pass through the openings when the disk rotates. Each of the lenses is clamped between the bottom wall units of the disk halves in such a manner that a portion of the lens is fitted within a corresponding one of the recess units of one of the disk halves while another portion of the lens is fitted within a corresponding one of the recess units of the other one of the disk halves. Thus, the light beam can pass through the lenses at different times during rotation of the disk body.

BRIEF DESCRIPTION OF THE DRAWINGS

Other features and advantages of this invention will become more apparent in the following detailed description of the preferred embodiments with reference to the accompanying drawings, in which:

FIG. 2A is a sectional view of the conventional rotary disk;

DETAILED DESCRIPTION OF THE PREFERRED EMBODIMENTS

Figure 1:
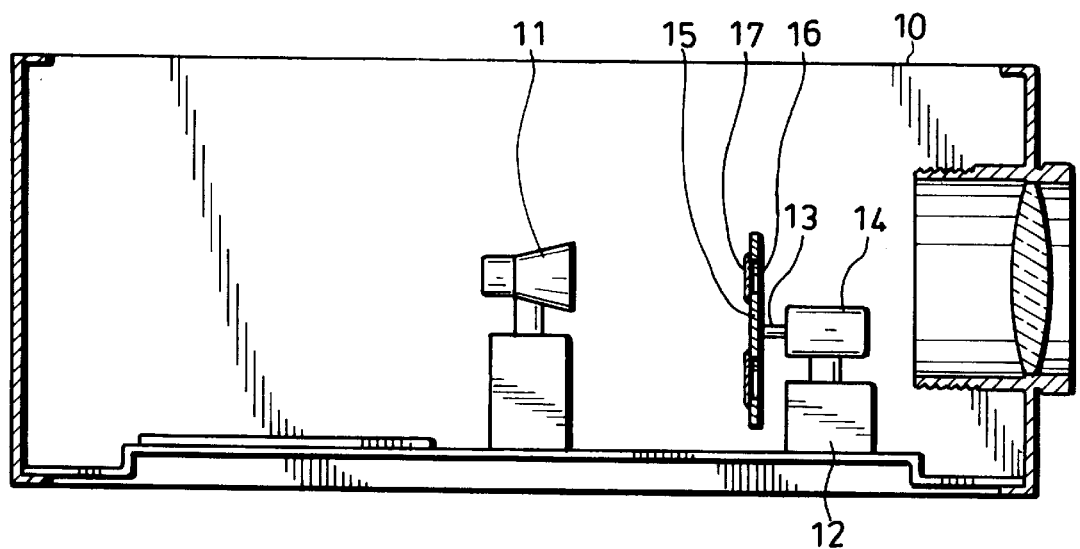
FIG. 1 is a schematic view of an image-changing device, in which a conventional rotary disk is employed.
Figure 2:
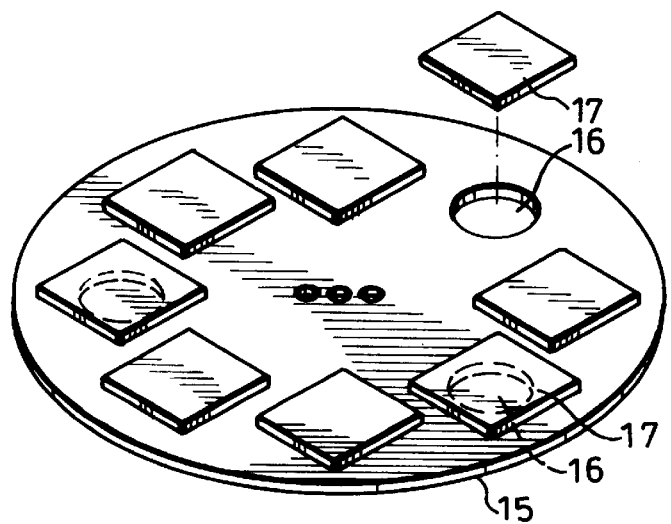
FIG. 2 is a perspective view of the conventional rotary disk.
Figure 3:
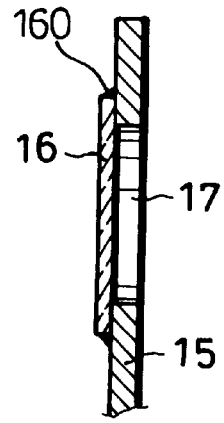
FIG. 3 is a perspective view showing the disk body of another conventional rotary disk.
Figure 3:
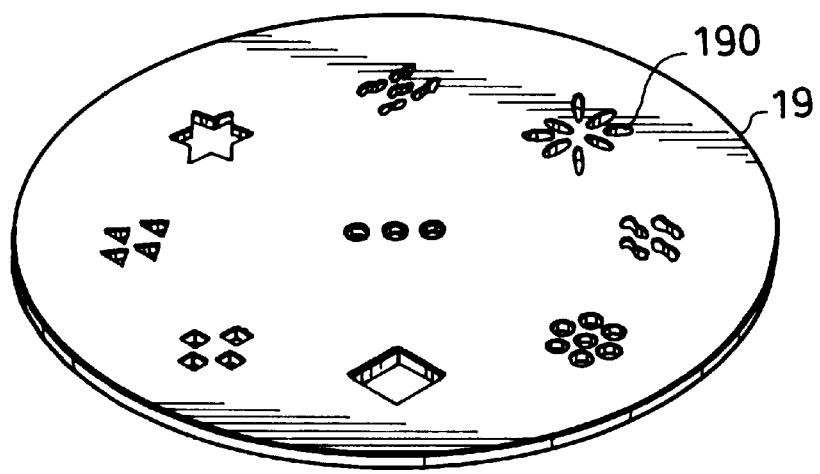

Before this invention is described in greater detail, it should be noted that the same reference numerals have been used to denote like elements throughout the disclosure.

Figure 4:
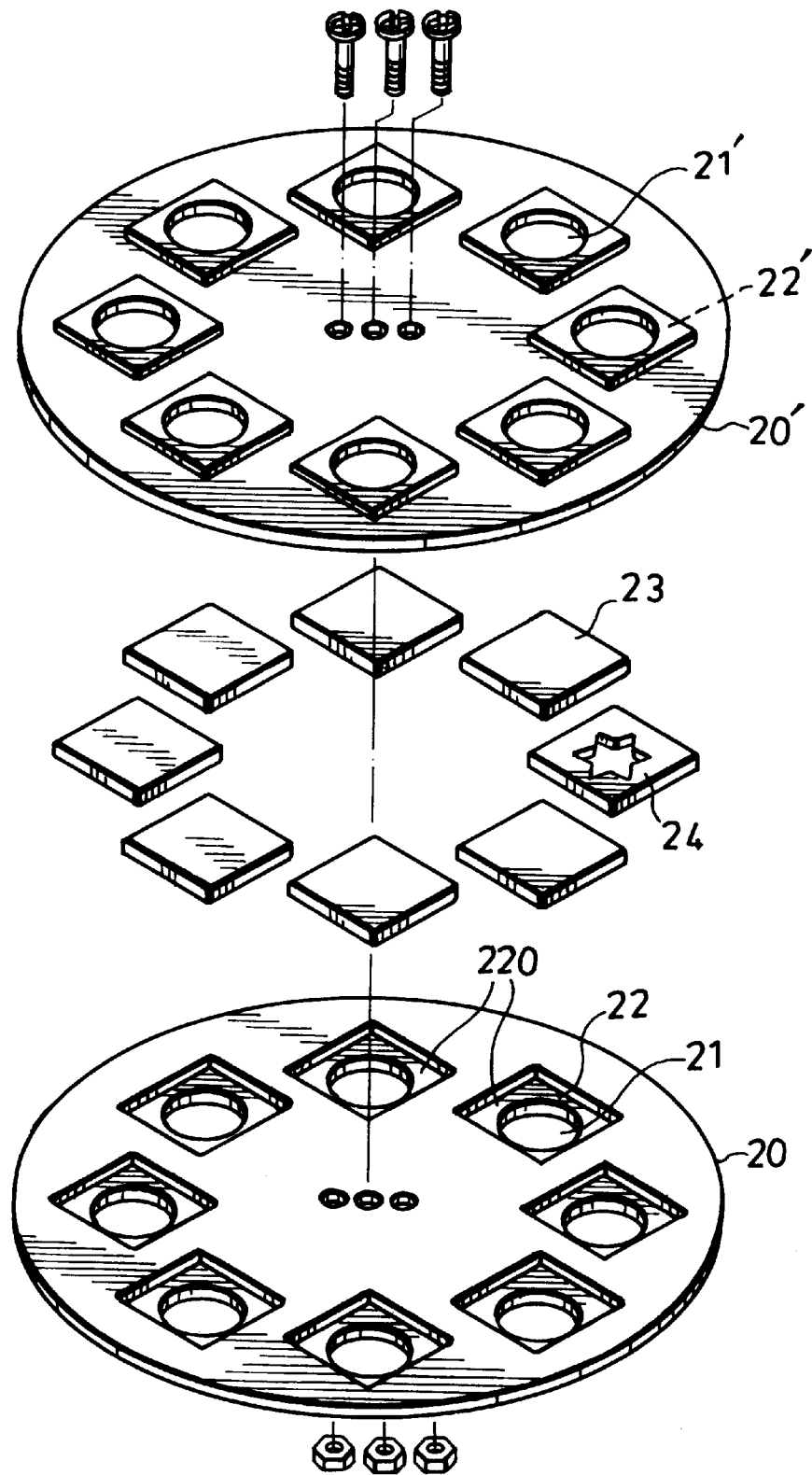
FIG. 4 is an exploded view of the first preferred embodiment of a rotary disk of this invention.
Figure 4A:
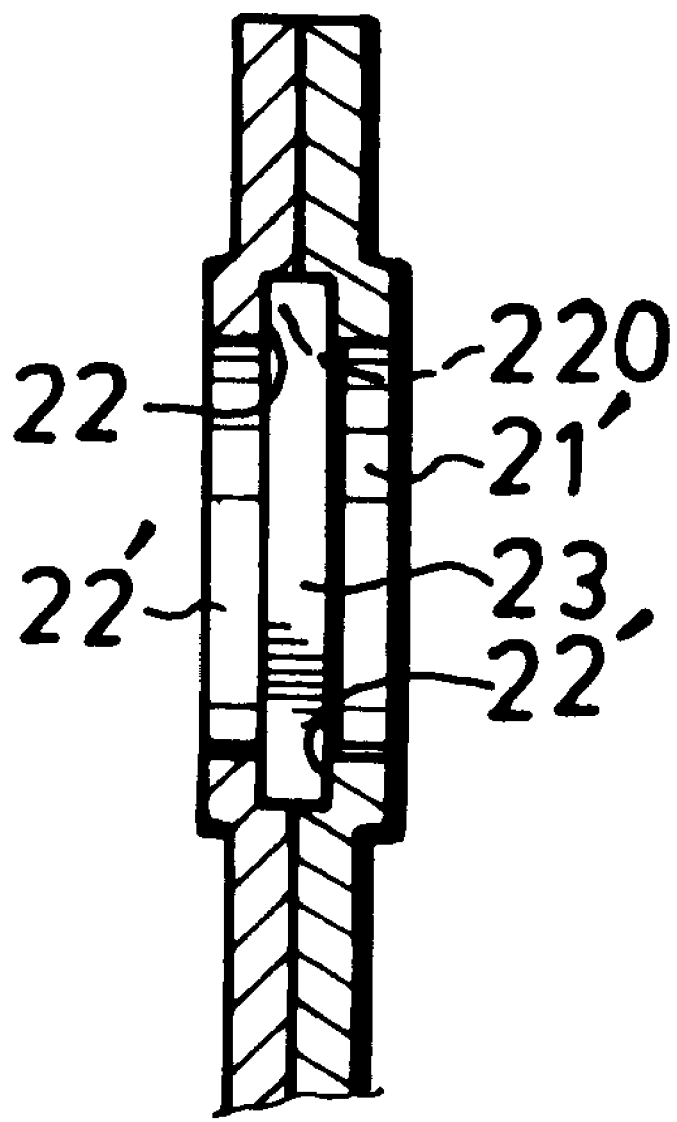
FIG. 4A is a sectional view of the first preferred embodiment of this invention.

Referring to FIGS. 4 and 4A, the first preferred embodiment of a rotary disk according to this invention is shown to be adapted to be employed in an image-changing light device. As illustrated, the disk includes a metal disk body consisting of two disk halves 20, 20' coupled detachably with each other by means of screws and nuts, and a plurality of colored lenses 23. One of the colored lenses 23 is provided with a star-shaped opening 24. Each of the disk halves 20, 20' is pressed to form a circle of angularly spaced recess units 22, 22' and is punched to form a circle of openings 21, 21' through the disk half 20, 20'. In the first preferred embodiment, each of the recess units 22, 22' is a generally rectangular recess formed in one of the disk halves 20, 20' and defined by a bottom wall unit 220 which is a generally rectangular bottom wall. Each of the openings 21, 21' is a circular opening formed through a central portion of a corresponding one of the bottom units.

Each of colored lenses 23 is clamped between the bottom walls 220 of the disk halves 20, 20' in such a manner that a portion of the lens 23 is fitted within a corresponding one of the recess units 22, 22' of one of the disk halves 20, 20' while another portion of the lens 23 is fitted within a corresponding one of the recess units 22, 22' of the other one of the disk halves 20, 20'. Thus, a light beam emitted from the light emitting unit (not shown) of the light device can pass through the lens 23 at different time during rotation of the disk body. Note that the lenses 23 can be mounted easily between the disk halves 20, 20'. Each of the openings 21 formed through the lens 23 can be of any designs so as to provide different figures.

Figure 5:
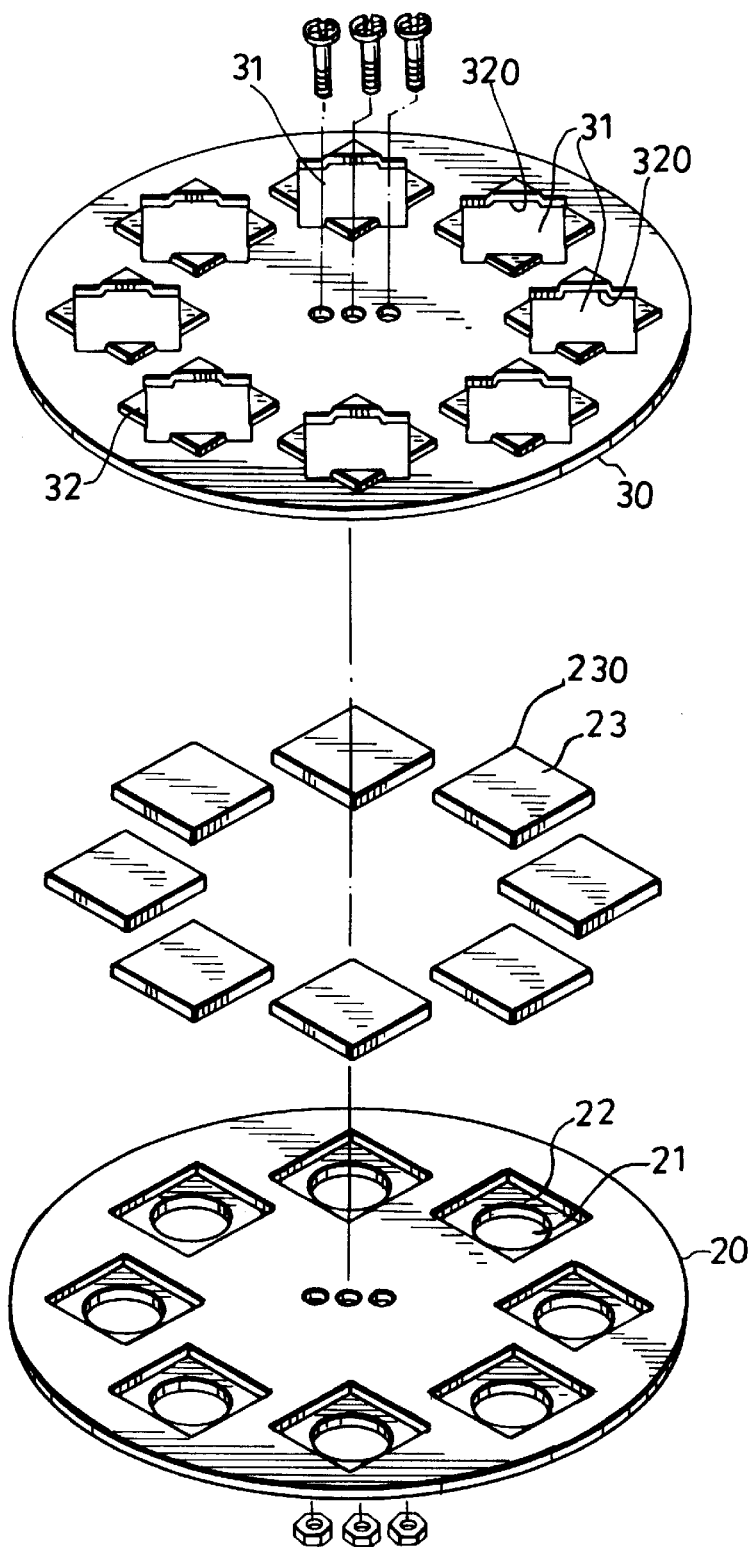
FIG. 5 is an exploded view of the second preferred embodiment of a rotary disk of this invention.
Figure 6:
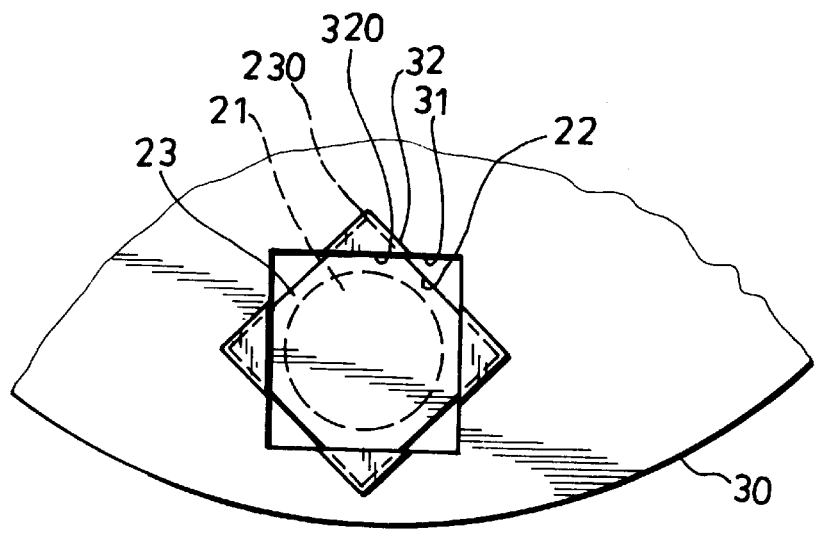
FIG. 6 illustrates how the halves of the disk body clamps a colored lens in the second preferred embodiment of this invention.

Referring to FIGS. 5 and 6, a second preferred embodiment of a rotary disk according to the present invention is shown to be generally similar to the first preferred embodiment, except that the disk half 30 is punched to form a plurality of rectangular openings 31 through the recess units 32 respectively. Each of the openings 31 is a generally rectangular opening formed through one of the disk halves 30. Each of the recess units 32 includes four triangular recesses which are formed in the disk half 30 and which are communicated with a corresponding one of the rectangular openings 31. Each of the bottom wall units 320 of the disk half 30 includes four triangular bottom walls which respectively press four corners 230 of a corresponding one of the lenses 23 against the other disk half 20.

Figure 8:
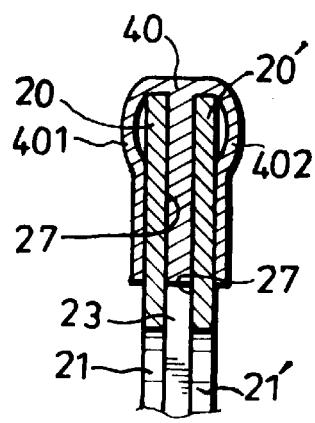
FIG. 8 is a sectional view illustrating a portion of the third preferred embodiment of this invention.
Figure 7:
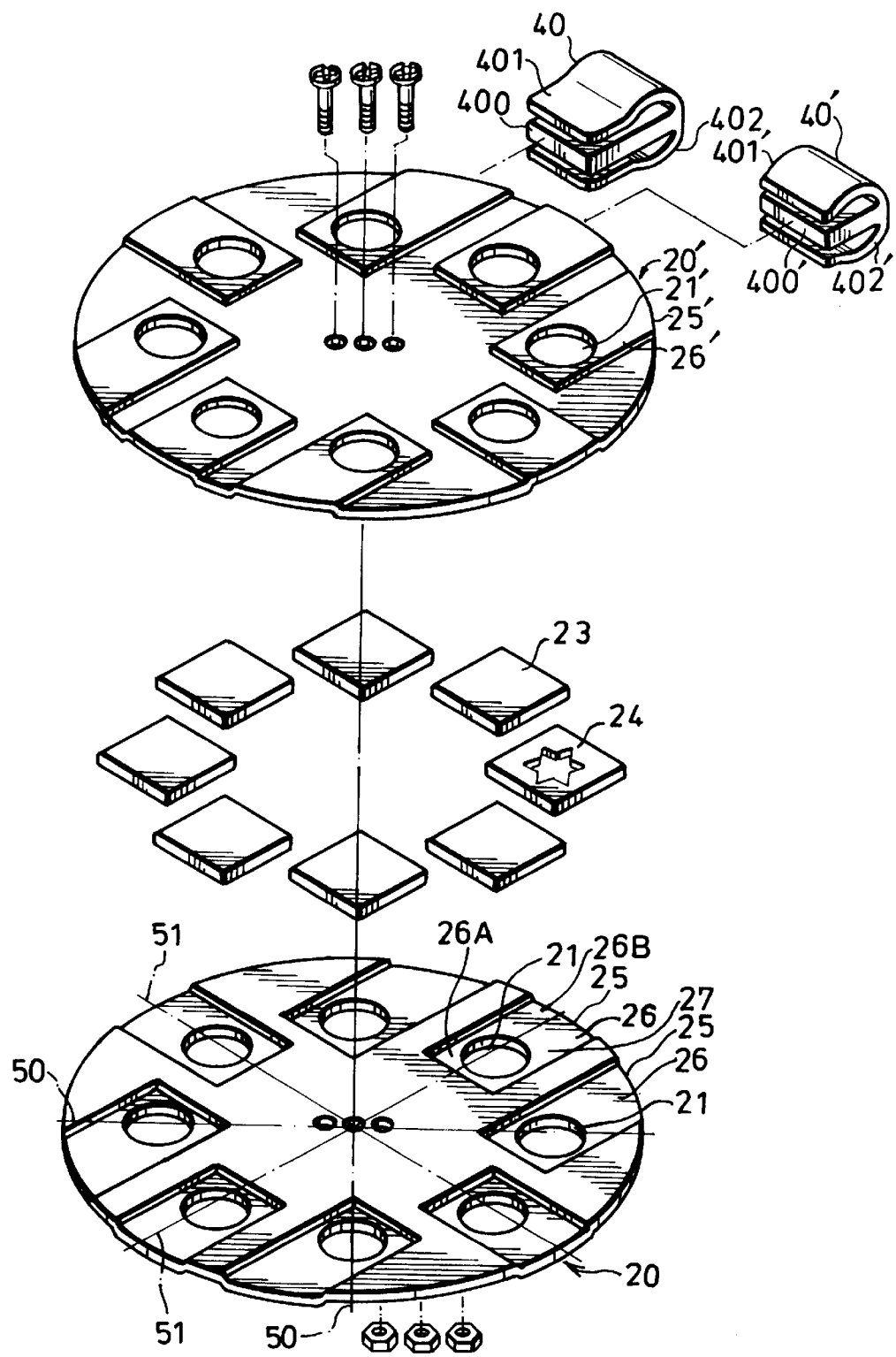
FIG. 7 is an exploded view of the third preferred embodiment of a rotary disk of this invention.

Referring to FIGS. 7 and 8, the third preferred embodiment of this invention includes two disk halves 20, 20', several lenses 23, and several unitary clips 40, 40'. Each of the recess units 26 of the halves 20, 20' is an elongated recess formed in each of the disk halves 20, 20'. Each elongated recess has an inner end section 26A and an outer end section 26B which terminates at a periphery 25 of the disk half 20, 20'. Each bottom wall unit is an elongated bottom wall 27 that has an inner end section defining the inner end section 26A of a corresponding elongated recess. Each of the openings 21 is a circular opening formed through the inner end section of a corresponding one of the elongated bottom walls 27.

As illustrated in FIG. 8, each of the clips 40, 40' clamps one of the lenses 23 between two of the elongated bottom walls 27, and has two clamping arms 401, 401', 402, 402' clamping the disk halves 20, 20' therebetween, and a positioning arm 400, 400' located between the clamping arms 401, 401', 402, 402' and inserted into the inner end sections of the recess units 26 of the disk halves 20, 20' so as to abut against a corresponding one of the lenses 23. Thus, the lenses 23 are positioned between the disk halves 20, 20'. The features and objects of the second and third preferred embodiments are the same as those of the first preferred embodiment.

With this invention thus explained, it is obvious to those skilled in the art that various modifications and variations can be made without departing from the scope and spirit thereof. It is therefore intended that the invention be limited only as in the appended claims.

I claim:

1. A rotary disk adapted to be disposed in an image-changing light device which includes a box-like container for mounting the disk therein, an electric motor mounted in the container so as to rotate the disk, and a light emitting unit mounted in the container for permitting passage of a light beam emitted from the light emitting unit through the disk, the disk comprising:

a metal disk body including two disk halves coupled detachably with each other, each of the disk halves being pressed to form a circle of angularly spaced recess units and being punched to form a circle of openings through the disk half, each of the recess units being defined by a bottom wall unit through a portion of which a corresponding one of the openings is formed so that the light beam emitted from the light emitting unit can pass through said openings when the disk rotates; and a plurality of colored lenses, each of which is clamped between the bottom wall units of the disk halves in such a manner that a portion of the lens is fitted within a corresponding one of the recess units of one of the disk halves while another portion of the lens is fitted within a corresponding one of the recess units of the other one of the disk halves, the light beam emitted from the light emitting unit passing through the lenses at different times during rotation of the disk body.

2. The rotary disk as defined in claim 1, wherein each of the recess units is a generally rectangular recess formed in one of the disk halves, each of the bottom wall units being a generally rectangular bottom wall which defines a corresponding one of the generally rectangular recesses, each of the openings being a circular opening formed through a central portion of a corresponding one of the bottom wall units.

3. The rotary disk as defined in claim 1, wherein each of the openings of a first of said disk halves is a generally rectangular opening formed through said first disk half, each of the recess units in said first disk half including four triangular recesses which are formed in said first disk half and which are communicated with a corresponding one of the generally rectangular openings, each of the bottom wall units of said first disk half including four triangular bottom walls which respectively press four corners of a corresponding one of the lenses against the other one of the disk halves.

4. The rotary disk as defined in claim 1, wherein each of the recess units includes an elongated recess which is formed in one of the disk halves and which has an inner end section and an outer end section terminating at a periphery of the disk half, each of the bottom wall units being an elongated bottom wall which has an inner end section that defines the inner end section of a corresponding one of the elongated recesses, each of the openings being a circular opening formed through the inner end section of a corresponding one of the bottom wall units, the disk further including several unitary clips each of which clamps one of the lenses between two of the elongated bottom walls, and each of which has two clamping arms for clamping the disk halves therebetween, and a positioning arm located between the clamping arms and inserted into the inner end sections of the recesses of the disk halves so as to abut against a corresponding one of the lenses, thus positioning the corresponding one of the lenses between the disk halves.

* * * * *